Patented Oct. 7, 1941

2,258,291

UNITED STATES PATENT OFFICE 2,258,291

ART OF PROMOTING THE GROWTH OF PLANTS

Franklin D. Jones, Llanerch, Pa., assignor to American Chemical Paint Company, Ambler, Pa., a corporation of Delaware No Drawing. Application December 23, 1938, Serial No. 247,366

14 Claims. (Cl. 47—58)

This invention relates to the art of promoting the propagation or growth of plants, and has particular reference to compositions and methods for promoting the growth of higher plant life as distinguished from lower or parasitic plant life such as fungi.

An important object of the invention is to provide a distinctively new class of relatively inexpensive and exceptionally effective plant growth substances and fungicides.

Another object is to provide a class of compositions which are fatal to lower or parasitic plant life such as fungi and to diseases caused by fungi but which are not harmful to either higher plant or animal life.

Another object is to provide a class of plant growth compositions and fungicides which do not require any particular degree of skill or care for their application.

Another object is to provide a class of fungicides which readily lend themselves for direct application to fungus-infested plants and to the soil in which the plants are set for the eradication of the fungi and the diseases caused by the fungi.

Still another object is to provide relatively simple and inexpensive and exceptionally effective methods of treating plants to promote their growth, to eradicate fungi and diseases caused by fungi and to render plants more resistant to such diseases.

Prior to the present invention, certain organic compounds, now variously referred to as "plant hormones," "growth promoters," "growth regulators" and "growth substances," were known to have a decided stimulating effect on the growth of plants. As examples of such substances, which will hereinafter be referred to by the term "plant hormones," may be mentioned phenyl, naphthyl, and indole acetic, propionic and butyric acids and certain of their derivatives such as the nitriles, lower alkyl esters and alkali metal and ammonium salts. There are other substances in addition to those mentioned which may be used to promote plant growth, and other suitable growth substances are continually being discovered. For instance, I have recently discovered that the amides of the plant hormone acids in the foregoing list are particularly effective as growth substances. As examples of suitable amides may be mentioned naphthylacetamide and indole acetamide.

It was recognized by prior workers in the art that plant hormones are effective even when used in very minute concentrations and that smaller concentrations can be used with beneficial results when the hormones are in liquid or aqueous media than when they are applied in dust form in admixture with an inert carrier or filler such as talc. This difference in effective concentrations is very likely due to the fact that plants can take up the plant hormones much more readily from a liquid or aqueous medium than they can from a solid medium.

It was also recognized that if the plant hormones are used in too great concentration, they may have a tendency to cause inhibition of growth and may definitely injure the plant instead of stimulating its growth. Since plant hormones are not taken up so readily from solid media as from liquid media, it follows that it is generally safer for the plant to apply the growth substance in dust form, for an overdosage is not so likely to prove toxic to the plant.

It may be noted at this point that the tendency of overdoses of plant hormones to poison the plant appears to be counteracted to an appreciable extent by the fact that plants have the capability within varying limits of gradually taking up and carrying off the active ingredient of the plant hormone mixture, so that they are not at any one time subjected to the full concentration of the hormone. The lower or parasitic plants do not appear to possess the capability of carrying off the hormones to nearly the same extent as do the higher plants. Hence, they are much more likely to be poisoned by an overdosage of plant hormone than are the higher plants. As will hereinafter be pointed out, this difference renders it possible to employ the various plant growth substances as fungicides in addition to their usual function of growth promotion.

Prior to this invention, it was also known that another substance, thiourea, not generally included among the class of plant growth substances or hormones can be used to improve the germination of lettuce seed and to break dormancy in bulbs such as gladioli and in tubers such as potatoes. In the case of thiourea, unlike the hormones, relatively high concentrations (½ to 1%) were considered absolutely essential to obtain satisfactory results. It is to be noted, however, that certain investigators (Hutchings and Larsen) have reported that soaking cuttings in a ¼% solution of thiourea produced no acceleration of rooting and in fact appeared to injure the plant.

In one of its aspects, the present invention is based in part upon the discovery or observation that thiourea and its isomer, ammonium thiocyanate, can be employed to stimulate plant growth, either singly or together or in admixture with the hormones in much smaller concentrations and with much greater effectiveness than had previously been considered possible in the case of thiourea, when used as previously noted to improve germination and to break dormancy.

In another of its aspects, the invention is based in part upon the discovery or observation that the plant hormones as well as thiourea and ammonium thiocyanate, either singly or together, when employed in concentrations above those necessary to stimulate the growth of plants but in concentrations insufficient to cause inhibition of growth of the higher plants, have an inhibitive effect on parasitic plants such as fungi. The reason for this difference in effect of the foregoing substances on the two different types of plants appears to be the fact, as previously noted, that fungi do not have the capability of carrying off the various growth substances to the same extent as do the higher plants. Hence, when the substances are applied in concentrations above those necessary to stimulate the growth of plants, the fungi are more easily poisoned by the overdosage than are the higher plants.

The substances above mentioned are particularly effective as fungicides against the three fungi, Pythium debaryanum, Phytophthora cactorum, and Rhizoctonia solani, which are the principal causes for the plant disease known as "damping off." These substances when used in sufficient concentrations are fatal both to the fungi and to the parasitic diseases caused by the fungi. This fact is of the greatest importance to plant growers, for once a plant disease such as damping off starts in a bed of plants it spreads like wild fire and may destroy the entire bed unless it is checked.

The plant growth substances of the invention contain thiourea or its isomer, ammonium thiocyanate, or both of these substances in admixture as essential ingredients. Thiourea and ammonium thiocyanate have a specific effect on plants when applied in extremely small amounts or dilutions. For instance, an aqueous solution of thiourea containing 1 to 200 parts of thiourea by weight to ten million parts of solution causes stimulation of top growth and extension of roots, which effect is particularly noticeable in the case of small seedlings. In this connection, it is to be noted that the plant hormones apparently do not stimulate root elongation as do thiourea and ammonium thiocyanate, but that these two latter substances apparently do not stimulate root initiation as do the plant hormones.

As previously noted, the thiourea or ammonium thiocyanate may be applied in the form of an aqueous solution. These substances may also be applied in the form of an aqueous or other type of suspension or emulsion with an oil or fat of either vegetable, animal or mineral origin such as olive oil, castor oil, lanolin or petroleum oil, etc. A particularly effective way of applying the growth substance, particularly in the case of thiourea, is to mix it in dry or dust form with an inert filler or carrier such as talc, bentonite, clay, kaolin, charcoal, ground carbon or wood flour. Higher concentrations must be used in case the growth substance is applied in the form of dust than when it is applied in solution, suspension, or emulsion form. The dust form is preferable for the reason that there is less danger of overdosing the plant. Ammonium thiocyanate, because of the fact that it is deliquescent can more advantageously be applied in solution, suspension or emulsion form than in dust form.

The plant growth compositions of the invention may in addition to thiourea or ammonium thiocyanate contain one or more of the plant hormones, e. g. one or more of the illustrative substances previously listed. In such case, the mixture acts in substantially the same general way as the plant hormone itself but with much greater effectiveness due to the fact that the thiourea or ammonium thiocyanate speeds up the rate of absorption of the plant hormone by the plant, apparently by increasing cell permeability and rate of transport. The mixture of thiourea or ammonium thiocyanate and plant hormone may be in the form of a solution, suspension or emulsion, as has been stated in the case of thiourea or ammonium thiocyanate when used without the plant hormone. Certain of the hormones such as the acids and esters are practically insoluble in water, and hence must first be dissolved in a small quantity of a suitable solvent such as ethyl alcohol and then diluted to the desired concentration.

To promote plant growth, the compositions of the invention may be applied to plants, slips, leaf cuttings, stem cuttings, scions, tubers, seeds, bulbs, seedlings, fruit or flowers. Contrary to the practice of prior workers in the art, I use very small quantities of thiourea and ammonium thiocyanate, whether the substance be in liquid or solid form.

To induce better rootings of cuttings, the base of the cutting may be dipped into a powder composed of 1 to 3 parts of thiourea by weight, 9 parts of plant hormone and 10,000 parts of talc. Ammonium thiocyanate may be substituted in whole or in part for the thiourea, though as previously stated it has the disadvantage of being deliquescent. Any of the known plant hormones may be employed in the formula, and the talc may be varied from 2,500 parts by weight to 50,000 parts. It is to be particularly noted that the thiourea or ammonium thiocyanate not only increases the effectiveness of the plant hormone but also serves to keep the cutting fresh until rooting starts and lessens premature wilting and dropping of leaves.

If the cuttings are treated by soaking in a solution of the growth composition of the invention, the solution should contain from 1 to 25 parts of the thiourea-hormone mixture per 250,000 parts of water, the concentration varying according to the species of plant. The thiourea-hormone mixture should contain 5 to 50% of thiourea and 95 to 50% of plant hormone. As previously stated, the dust treatment is preferable to the solution treatment because there is less danger of poisoning the cutting by overdosage. Furthermore, the action of the dry mixture on the plant appears to be somewhat different. In the case of the solution method, the cutting must be water-logged, for the effect depends upon getting as much hormone through the transpiration stream into the cutting as it will tolerate without being poisoned. In the case of the dust method, the hormone is absorbed slowly over a week or so into the base of the cutting, and the plant may take up just what it requires. While I prefer to treat the base of the cutting with the powder, a permissible variation is to treat the cutting at the top and then to plant the cutting.

Seeds and bulbs may be treated by soaking them in a solution of the composition of the invention for about twenty-four hours. The seeds after treatment may be dried sufficiently to permit them to be handled in sowing. I have found it preferable to dust the seed and bulbs with the dry composition. Their response depends upon the concentration of the growth substances, there being some variation with species. The effective range in the case of seed seems to be from 1 to 10 parts of thiourea-hormone mixture to each 10,000 parts of talc or other filler. Bulbs, for the most part, seem to tolerate as high as 1 part of growth substance to 100 parts of dust, although stimulating effects have been observed with as low as 1 to 10,000 dispersion of growth substance in dust.

The growth substances of the invention may be applied to growing plants by spraying or in other suitable ways known to the art. Growing intact plants show a noticeable response to thiourea-hormone concentrations as low as 1 part in 100,000,000 parts of solution, the effect increasing to a maximum and then decreasing as the strength of the solution increases until finally at a concentration of about 1 part in 100,000 there is no observable effect. If the concentration is further increased, there is a definite inhibition of growth and injury to the plant. Solutions containing as little as 1 to 20 parts of thiourea-plant harmone mixture dissolved in 10,000,000 parts of water produce a marked stimulation of growth both above and below the ground level. Greater concentrations of growth substances are necessary to produce the same degree of stimulation if they are in dust form.

The fungicides of the present invention may contain any one or more of the substances previously mentioned; i. e. either thiourea, ammonium thiocyanate or the plant hormones. In addition to one or more of these active substances, the composition may contain a solvent, an oily or fatty suspension medium or an inert carrier or filler as has been stated in reference to the plant growth substances. The effective concentrations are as a general rule somewhat higher than those necessary to stimulate higher plant life, there being some overlapping in concentrations between those effective for growth stimulation and those effective for fungicidal effect. The overlapping in concentrations appears to be greater in case the growth substances are used in dust form than when they are used in liquid form. The fungi that respond to the hormones are stimulated at about the same concentrations as the higher plants, but toxicity frequently starts with solutions as dilute as 1 to 250,000, the toxic effect increasing with the strength of the solution. At concentrations of 1 to 2 parts per 100,000, the toxic effect on fungi is very marked with practically no effect on higher plants. In the case of the compositions in dust form, the toxic range for fungi appears to be 1 part in 1000 to 1 part in 25,000, the preferable range being 1 part in 1000 to 1 part in 5000.

When made up in the form of a solution, the fungicide may advantageously have incorporated therewith a wetting agent to facilitate penetration of the fungi by the composition. As examples of suitable wetting agents may be mentioned sulphonated alcohols of the fatty series having from eight to thirty carbon atoms. The wetting agent may be present in about ten parts to 100,000 parts of composition. Of the other 99,990 parts, one or two parts may be the active ingredient and the remainder may be the solvent.

A suitable dry composition may contain one part of active ingredient in powdered crystalline form and about 999 parts of a dry inert filler such as talc or a clay such as bentonite.

The fungicidal compositions of the present invention may be applied for the eradication of fungi and parasitic diseases in at least one or more of the following ways:

1. To the seed or bulbs before sowing or planting.
2. To the soil before or after planting.
3. To the seedlings when they have barely emerged.
4. To the grown plants.
5. To the fruit.

A very effective way to treat the seed is to soak them in a fungicidal solution for about twenty-four hours. Not only does this treatment rid the seed of spores of fungi, but it also greatly improves the germination. The seeds after treatment may be dried sufficiently to permit them to be handled in sowing. Instead of soaking the seed in a fungicidal solution, the seed may be dusted with the dry composition.

Excellent results have also been obtained by applying the compositions directly to the diseased area of seedlings or plants. In an actual test, two different compositions of the invention were applied to two infected areas in a bed of stock seedlings which were one-half to an inch tall. The seedlings were in rows and the two infected areas were about six inches long and near the center of the bed. On one spot were poured two ounces of a 1:50,000 water solution of indole butyric acid, and on the other spot were poured two ounces of a 1:50,000 water solution of alpha naphthalene acetic acid. The damping off was checked completely. The seedlings were potted two weeks later and there was no recurrence of the disease. Similar effective results were obtained with lupine seedlings and with winter marigold seedlings.

The fungicides of the invention have many advantages over the various types of fungicides which have been previously used or suggested. Those of the prior art are very toxic to animal and plant life. The fungicides of this invention are relatively unstable, particularly in the presence of light and air. After their work of eradicating the fungus and the fungus disease is finished, they deteriorate into substances which are innocuous to animal and plant life. Their effect on the fungus and the disease, however, appears to be permanent and the plant disease does not recur.

It will be understood that the various growth substances differ somewhat in their effectiveness as fungicides. For example, of the plant hormones the naphthyl substituted acids appear to be the most effective, then come the indole substituted acids and finally the phenyl substituted acids. The salts are about as effective as the acids, and the effectiveness of the esters appears to decrease with increasing molecular weights. As examples of suitable salts may be mentioned the sodium, potassum and ammonium salts of each of the aforementioned acids. As examples of suitable esters may be mentioned the methyl, ethyl and isopropyl esters. As in the case when the foregoing plant hormones are used to stimulate plant growth, the addition of minute quantities of thiourea or ammonium thiocyanate appears to increase their effectiveness as fungicides. As previously noted, thiourea and ammonium thiocyanate may be used as fungicides without the plant hormones.

The use of the term "plants" in the appended claims is intended to include plants, slips, leaf cuttings, stem cuttings, scions, tubers, roots, seeds, bulbs, seedlings, fruit and flowers, wherever the context permits.

Reference is hereby made to Application Serial No. 187,933 filed January 31, 1938, of which the present application is a continuation in part.

The foregoing specification and description include the essential and distinctive thought of my invention, but it is to be distinctly understood that the same may be modified in various ways and combined with various other details without affecting the peculiar results obtained, and without departing from the spirit of the invention or the scope of appended claims, in which I intend to claim all patentable novelty inherent in my invention.

I claim:

1. A composition of matter for application to plants, said composition containing as an essential ingredient thereof thiourea, said composition also containing an inert diluent for the essential ingredient, said diluent being a solvent for the essential ingredient, and the proportions of the essential ingredient and the diluent being in the ratio of more than 10,000 parts of the diluent to 1 part of the essential ingredient.

2. A composition of matter for application to plants, said composition containing as essential ingredients thereof one or more substances selected from the group consisting of thiourea and ammonium thiocyanate, said composition also containing an inert diluent for the essential ingredients, said diluent being a solvent for the essential ingredient, and the proportions of the essential ingredients and the diluent being in the ratio of 1 to 25 parts of the essential ingredients to 250,000 parts of the diluent.

3. A composition of matter for application to plants containing a plant hormone, a substance selected from the group consisting of thiourea and ammonium thiocyanate and an inert diluent.

4. A composition of matter for application to plants containing a plant hormone, a substance selected from the group consisting of thiourea and ammonium thiocyanate and an inert diluent, said diluent being a filler in powdered form.

5. A composition for the eradication of plant diseases due to fungi, containing as essential ingredients thiourea and a substance selected from the group consisting of phenyl, naphthyl, and indole acetic, propionic and butyric acids, their nitriles, lower alkyl esters, alkali metal and ammonium salts, said ingredients being present in greater concentration than that necessary to stimulate the growth of plants but in insufficient concentration to harm plant life other than fungi.

6. A method of treating plants, which consists in subjecting the plant to the action of a composition containing a plant hormone, a substance selected from the group consisting of thiourea and ammonium thiocyanate, and an inert diluent, said diluent being present in considerable excess of the other ingredients.

7. A method of treating seed before planting, which consists in treating the seed with a composition containing thiourea, a plant hormone and an inert filler, the mixture of thiourea and plant hormone being present in the proportion of 1 to 10 parts to each 10,000 parts of inert filler.

8. A method of treating plant cuttings, which consists in subjecting the base of the cuttings to the action of a composition containing 1 to 3 parts of thiourea by weight, 9 parts of a plant hormone and 10,000 parts of an inert filler.

9. A composition of matter for application to plants, said composition containing thiourea as an essential ingredient, the thiourea being present in a concentration in the order of one part to 10,000 parts of the composition.

10. A composition of matter for application to plants, said composition containing thiourea as an essential ingredient, the thiourea being present in a concentration substantially less than one part in 400 parts of the composition, the remainder of the composition being a substance selected from a group consisting of animal, mineral and vegetable fats and oils.

11. A method of treating plants, which consists in subjecting the plant to the action of a composition containing thiourea in a concentration in the order of one part of thiourea in 10,000 parts of composition.

12. A method of treating plants, which consists in subjecting the plant to the action of a composition containing thiourea and a solvent for the thiourea, the proportions of the solvent and the thiourea being in the ratio of more than 10,000 parts of the solvent to 1 part of the thiourea.

13. A growth regulating composition for plants containing as essential ingredients a plant hormone and thiourea.

14. A method of regulating the growth of plants which consists in applying to said plants a composition containing as essential ingredients a plant hormone and thiourea.

FRANKLIN D. JONES.